No. 843,238. PATENTED FEB. 5, 1907.
P. T. SIEVERT.
PROCESS AND APPARATUS FOR FIRE POLISHING PLATE GLASS.
APPLICATION FILED OCT. 23, 1906.

No. 843,238. PATENTED FEB. 5, 1907.
P. T. SIEVERT.
PROCESS AND APPARATUS FOR FIRE POLISHING PLATE GLASS.
APPLICATION FILED OCT. 23, 1906.

No. 843,238.                                      PATENTED FEB. 5, 1907.
P. T. SIEVERT.
PROCESS AND APPARATUS FOR FIRE POLISHING PLATE GLASS.
APPLICATION FILED OCT. 23, 1906.

No. 843,238. PATENTED FEB. 5, 1907.
P. T. SIEVERT.
PROCESS AND APPARATUS FOR FIRE POLISHING PLATE GLASS.
APPLICATION FILED OCT. 23, 1906.

No. 843,238. PATENTED FEB. 5, 1907.
P. T. SIEVERT.
PROCESS AND APPARATUS FOR FIRE POLISHING PLATE GLASS.
APPLICATION FILED OCT. 23, 1906.

No. 843,238. PATENTED FEB. 5, 1907.
P. T. SIEVERT.
PROCESS AND APPARATUS FOR FIRE POLISHING PLATE GLASS.
APPLICATION FILED OCT. 23, 1906.

UNITED STATES PATENT OFFICE.

PAUL THEODOR SIEVERT, OF DRESDEN, GERMANY.

PROCESS AND APPARATUS FOR FIRE-POLISHING PLATE-GLASS.

No. 843,238. Specification of Letters Patent. Patented Feb. 5, 1907.

Application filed October 23, 1906. Serial No. 340,156.

*To all whom it may concern:*

Be it known that I, PAUL THEODOR SIEVERT, a subject of the Emperor of Germany, residing at Dresden, in the Kingdom of Saxony, Germany, have invented a certain new and useful Improvement in a Process and Apparatus for Fire-Polishing Plate-Glass, of which the following is a specification, accompanied by drawings.

Various suggestions have been made, among others by the applicant himself, to fire-polish plate-glass produced on iron surfaces by having them passed immediately on their completion in horizontal position or suspended at one edge in front of melting-flames, by means of which the plate-glass is softened on the surface and can then take a fire-polish. These suggestions have not, however, given hitherto any practically satisfactory result. It is impossible to heat the whole surface of the glass plate by that method in good time in a permanent manner and to such an extent as required for obtaining the success desired. On the contrary, strains are produced which easily lead to the glass plate breaking.

According to this invention the process consists in suspending the glass plate by one edge in a vertical position and in several times introducing it into and removing again from a fire-chamber capable of accommodating the whole of the plate. In this way the whole of the surface of the plate is softened by renewed heating, and at the same time, owing to stretching under the influence of its own weight, it is made thinner and takes up fire-polish.

By introducing and again withdrawing therefrom a glass plate suspended by means of one edge into a fire-chamber accommodating the whole plate not only dangerous strains inside the glass are obviated, but it is also possible, as already stated, to reduce as desired the thickness or to stretch in a straight line the softened glass plate by the action of its own weight.

The polishing of the glass plate in the fire can be effected in such manner that it is introduced into the fire-chamber only in order to be left there until the polishing is completed. It is, however, better repeatedly to introduce the glass plate into the fire-chamber and to withdraw it again in order to allow it from time to time to solidify again, to a certain extent, outside the fire-chamber and to prevent excessively quick softening and flowing of the glass mass.

If it is desired merely to polish glass plates, they can be introduced into the fire-chamber in any desired direction. It is, however, best to arrange it so that a glass plate should be moved vertically downward, and vice versa. The reduction of the thickness of glass plates by stretching in the fire greatly assists the production of a very fine polish. In such cases it is advisable to roll the glass plates a little thicker at the beginning and then stretch them out subsequently to the desired thinness, and this is facilitated by heating the fire-chamber in such manner that its heat increases upward in a certain proportion. The process is then such that the glass plates are introduced from the top into the open fire-chamber, and following the stretching of the plate taking place in the upper hot layer the said plate is gradually withdrawn through the upper hotter layers of the fire-chamber and from the lower and cooler layers into the open air. In the open air the glass plate solidifies fairly quickly and it is possible to give the plate the desired thickness by withdrawing it from the fire-chamber more or less quickly. In such case it is useful to introduce the glass plate from time to time for a few seconds entirely into the fire-chamber in order to prevent the portions of the glass plate, the thickness of which has been sufficiently reduced, and which have in the meantime solidified, from sinking below a certain temperature.

The introduction of glass plates in vertical direction into the fire-chamber, whether or only for the purpose of polishing or for polishing and reducing the thickness, makes it possible to remove the glass plate from the rolling-table and to introduce it into the fire-chamber in a very quick and simple manner. This is of great advantage, more particularly for thin rolled-glass plates, as good results can only be obtained by making the operations to follow each other very quickly. For the purpose of reducing the thickness of glass plates their introduction into and removal from the fire-chamber in vertical direction is very advantageous, as the portion of the glass plate, the thickness of which has already been reduced, can be removed along the whole of its width from the fire-chamber into the open air for the purposes of solidification.

The apparatus for carrying out the process comprises, preferably, a suspension device arranged above a fire-chamber and enabling the glass plate to be vertically introduced into and removed from the fire-chamber. The introduction and the withdrawal can be effected by means of a hoist of any desired well-known construction with adjustable speed.

The suspension device for the glass plate itself can have various shapes. Thus, for instance, the glass plates could be simply seized, by means of tongs, and suspended to a support, or the edges of the glass plate could be flanged over and suspended direct on the support. A good suspension device must be, however, of such construction that it completely seizes the glass along one longitudinal edge, which is best effected by clamping the edge between two flat iron bars.

Two constructions of the apparatus according to this invention are illustrated, by way of example, in the accompanying drawings and are suitable for carrying out the process.

Figures 1 and 2 show an apparatus in which the glass plate is seized by the support by means of a mechanical clamping device, and Figs. 3-7 a device in which it is done by means of an electromagnet.

The apparatus comprises first of all a support 1, which can be, for instance, vertically adjustable in bearings 2. If desired, the support could of course be suspended in such manner as to enable it to be moved laterally, turned, or swung in order to enable it to be brought into the position required for seizing and transporting the glass plate. Generally, however, vertical adjustability of the support will be sufficient. The support is vertically moved by means of a motor 3—for instance, an electric motor. In the construction illustrated on the spindle of the electric motor is mounted a worm 4, engaging with an inclosed worm-wheel 5. On the spindle of the latter is mounted a toothed wheel 6, engaging with a toothed rack 7, secured to the support. It will be seen that by rotating the motor in one or in the other direction the support can be raised or lowered.

Vertically under the support is arranged a fire-chamber 8, which can be heated in any desired manner—for instance, by flues 9. The fire-chamber is generally closed by a cover 10, which is suitably made in two parts, which on being drawn apart uncover the inlet to the fire-chamber.

Laterally of the support and of the fire-chamber is arranged a rolling-table 11, on which takes place the manufacture of glass plates in any desired and well-known manner. The rolling-table is preferably arranged in such manner that it can be moved on its bottom frame 12 laterally to such an extent that its front edge 13 comes over the fire-chamber. The arrangement must be such that after the rolling the glass plate is seized by the support 1, raised from the rolling-table 11, and introduced into the fire-chamber 8. To that end must be provided a device enabling the support to be connected with the glass plate, preferably, as already stated, along the whole edge of the latter. In the construction shown in Fig. 1 this is effected by means of a mechanical clamping device. Next to the front edge 13 of the rolling-table 11 the latter is provided on the surface with a groove, into which is placed a bar 14, made of any desired suitable material—for instance, iron. The said bar is arranged in such manner that its upper edge is flush with the surface of the rolling-table At the bottom end of the support is provided a pin 15, on which are rotatably mounted two arms 16. These latter carry at their front ends a bar 17, which when the arms 16 are raised lies exactly over the bar 14, placed into the rolling-table.

The working of the apparatus is as follows: After the rolling of the glass plate the rolling-table 11 is moved into the position shown in Fig. 1. Then the support is lowered, and the arms 16, with the bar 17, folded in such manner that the said bar rests on the surface of the glass plate exactly over the bar 14. Then the bars 14 and 17 are connected together—for instance, by means of screws 18—and in this way the glass plate is clamped between the bars 14 and 17. Then the support 1 is raised and takes with it the still flexible glass plate, so that finally the latter after the turning of the arms 16 is suspended in vertical position over the fire-drum. Then the rolling-table is moved back, and when the fire-drum is opened the glass plate can be introduced into or withdrawn from the same, as desired.

Figure 1:
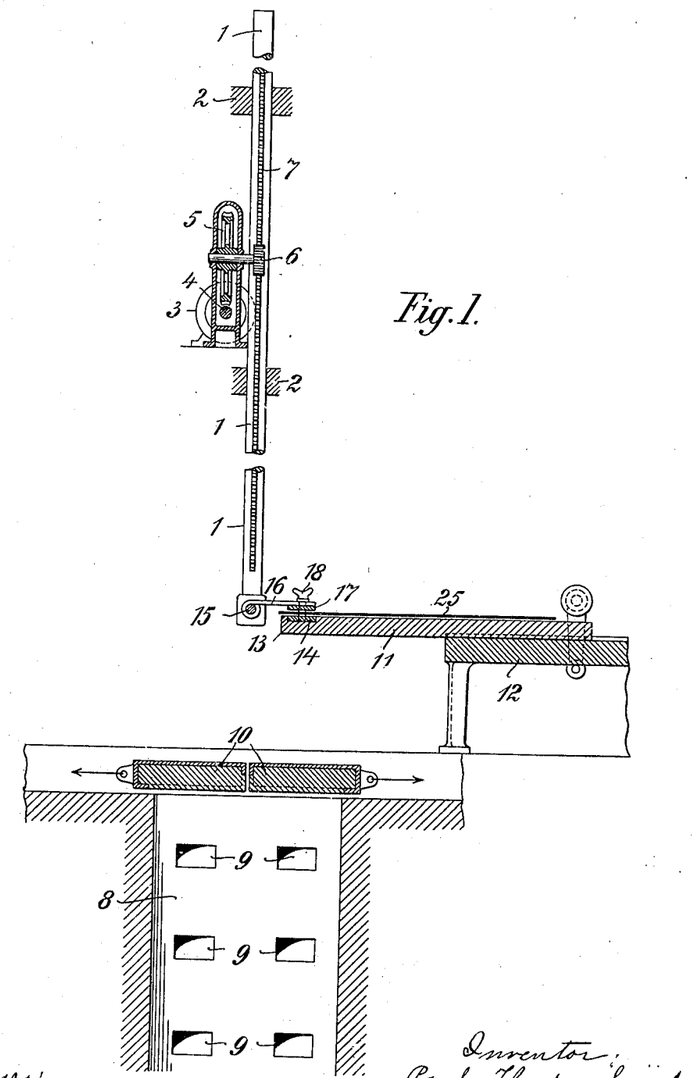
Fig. 1 shows the apparatus in side elevation in the position in which it is situated after the glass plate, which is still on the rolling-table, has been seized.
Figure 2:
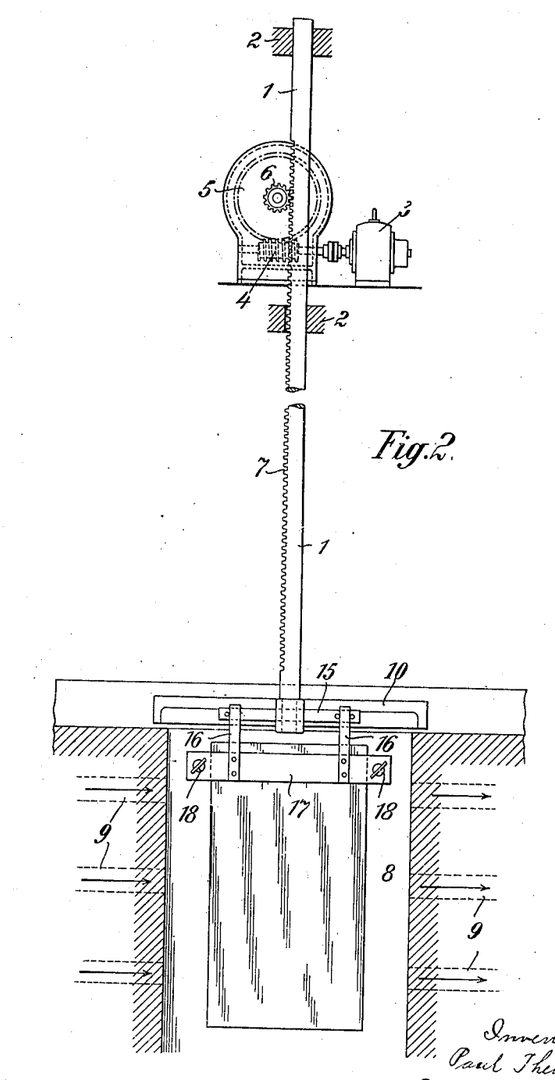
Fig. 2 shows the same apparatus after the introduction of the glass plate into the fire-chamber.
Figure 3:
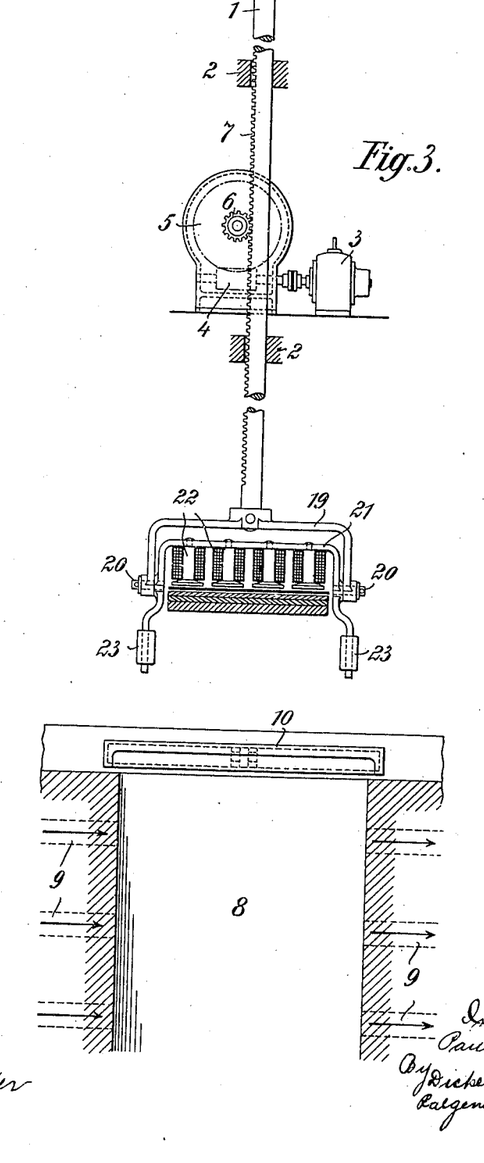
Figs. 3 and 4 show the apparatus with electromagnet in front and side elevation with the glass plate in the same position as that shown in Fig. 1.
Figure 4:
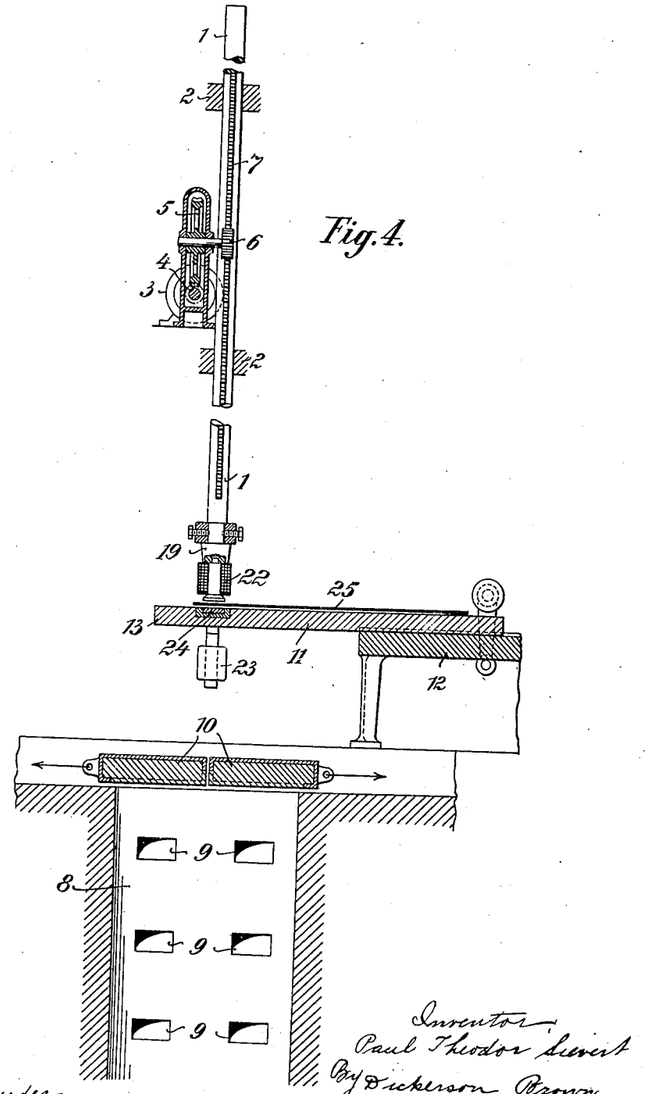

The connection of the support with the glass plate can be effected in a still simpler manner by means of the clamping device described and of an electromagnet, as shown in Figs. 3 to 7. As regards the mounting of the support, the fire-drum, and the rolling-table this apparatus is shown in Figs. 1 and 2; but instead of the arms 16, with the clamping-bar 17, the bottom end of the support is provided with a fork 19, in which is suspended a frame 21, rotatable about a pin 20. The said frame is provided with a series of electromagnets 22, as well as with balance-weights 23, which balance the weight of the electromagnets.

Figure 5:
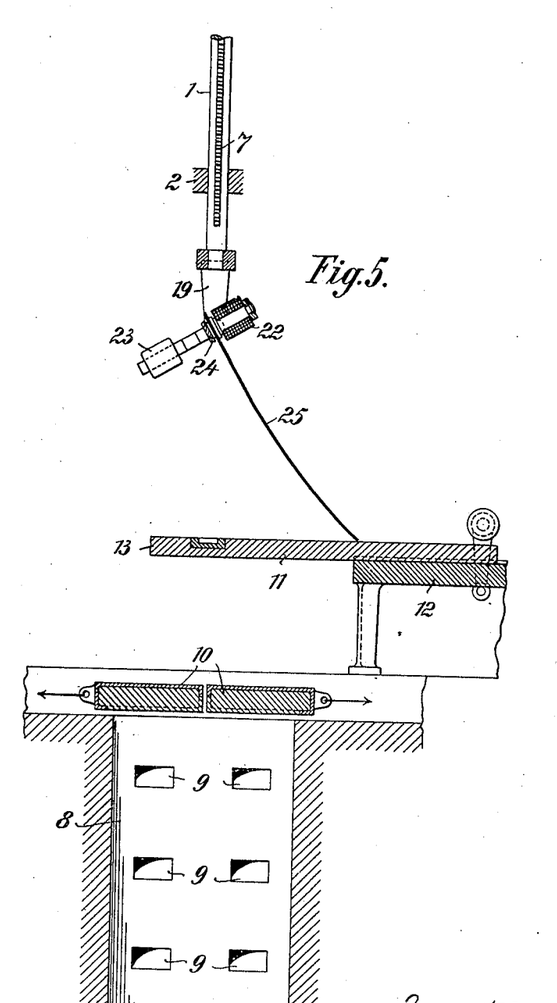
Fig. 5 shows the apparatus after the raising of the glass plate.
Figure 6:
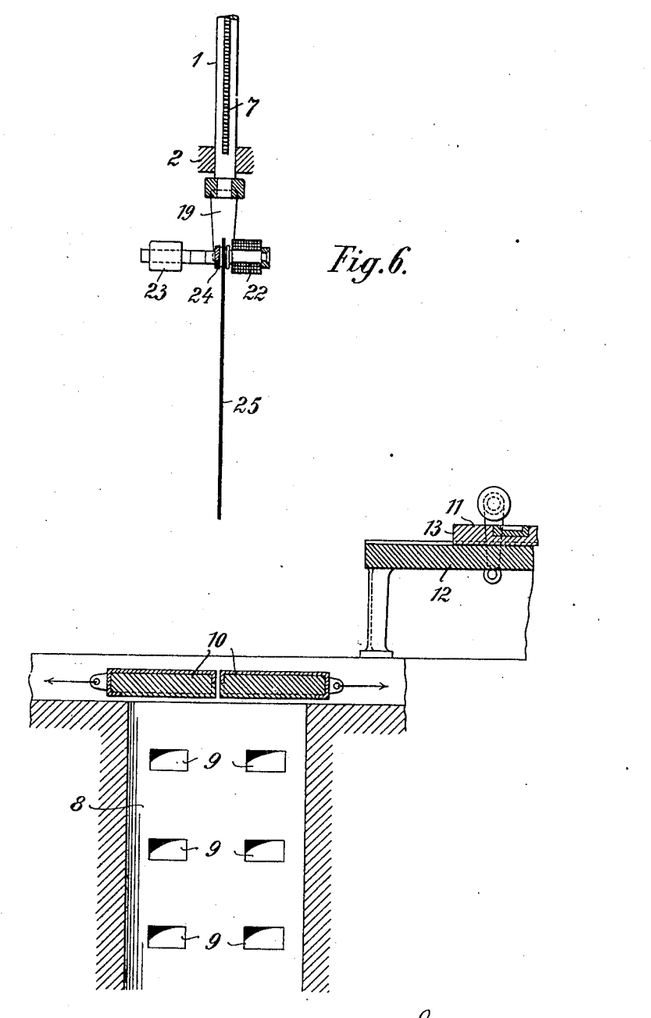
Fig. 6 shows the same apparatus after the removal of the rolling-table and immediately before the introduction of the glass plate into the fire-chamber.
Figure 7:
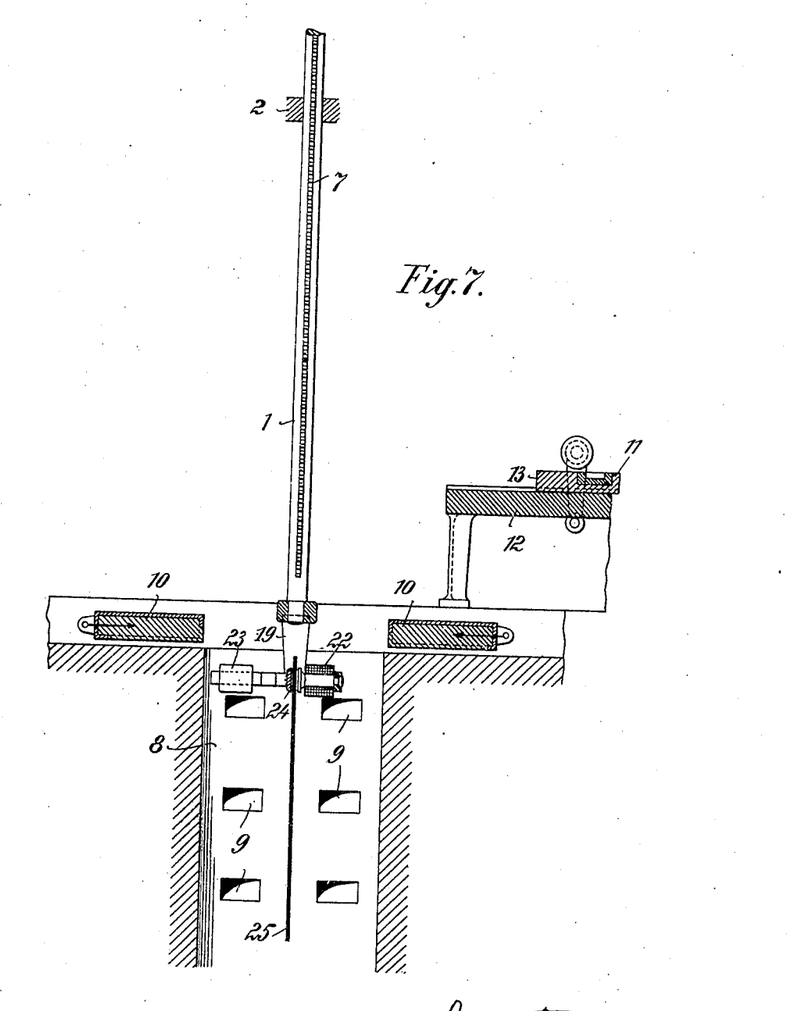
Fig. 7 shows the apparatus after the introduction of the glass plate into the fire-chamber.

In the groove at the front edge of the rolling-table is arranged a bar 24, as shown in Figs. 1 and 2, made of some magnetic material—that is to say, preferably of iron. After the rolling-table on completion of the rolling of the glass plate has been pushed under the support to such an extent that the bar comes to lie exactly under the poles of the electromagnets 22 and the support lowered until the electromagnets come in contact with the surface of the glass plate and the said electromagnets excited they attract the iron bar 24, as armature, and the glass plate is clamped between the electromagnet-poles and the iron bar. When the support is raised, it carries with it the glass plate. This is shown in Fig. 5, in which it will be seen how the glass plate 25 slightly bends when being raised from the rolling-table. As soon as it is freely suspended the rolling-table is moved back, (see Fig. 6,) and then, as shown in Fig. 7, the glass plate can be lowered into the fire-drum.

The electromagnet must be of such construction as to withstand the high heat of the heating-drum. The insulation of the winding must therefore be effected by means of some refractory material—for instance, asbestos or the like—in well-known manner.

The polished or the stretched and thinned glass plate is released from the support and in well-known manner finally cooled in a cooling-chamber or the like.

It is obvious that the kind of manufacture of the glass plate is immaterial from the point of view of this invention. The latter can be applied to glass plates manufactured in any desired manner—for instance, by rolling, casting, shaking, &c.

What I claim as my invention, and desire to secure by Letters Patent, is—

1. The herein-described process for fire-polishing plate-glass which consists in suspending a glass plate along one edge and introducing said plate into and removing it from a heating-chamber capable of accommodating the whole plate.

2. The herein-described process for fire-polishing plate-glass which consists in suspending a glass plate along one edge and repeatedly introducing said plate into and removing it from a heating-chamber capable of accommodating the whole plate.

3. The herein-described process for fire-polishing plate-glass which consists in suspending a glass plate along one edge in a vertical direction and introducing said plate into and removing it from a heating-chamber capable of accommodating the whole plate.

4. The herein-described process for fire-polishing plate-glass which consists in suspending a glass plate along one edge in a vertical direction, introducing said plate into and removing it from a heating-chamber capable of accommodating the whole plate and repeating the introduction until the glass plate becomes stretched under the influence of its own weight.

5. The herein-described process for fire-polishing plate-glass which consists in suspending a glass plate along one edge in a vertical direction, introducing said plate into a heating-chamber capable of accommodating the whole plate, heating said chamber to a temperature which increases upwardly, and conveying the glass plate from the cold or lower part of said chamber through the upper hotter part.

6. The herein-described process for fire-polishing plate-glass which consists in suspending a glass plate along one edge in a vertical direction, introducing said plate into a heating-chamber capable of accommodating the whole plate, heating said chamber to a temperature which increases upwardly, and conveying the glass plate from the cold or lower part of said chamber through the upper hotter part and regulating the rate at which the different portions of the glass plate are conveyed through said hot part.

7. In an apparatus for fire-polishing glass, the combination of a glass plate to be treated, a heating-chamber capable of accommodating the whole plate, means for supporting said plate along one edge, and means for introducing said plate into and removing it from said heating-chamber.

8. In an apparatus for fire-polishing glass, the combination of a glass plate to be treated, a heating-chamber capable of accommodating the whole plate, means for supporting said plate along one edge in a vertical position, and means for introducing said plate into and removing it from the heating-chamber.

9. In an apparatus for fire-polishing glass, the combination of a glass plate to be treated, a heating-chamber capable of accommodating the whole plate, means for supporting said plate along one edge in a vertical position, means for introducing said plate into and removing it from the heating-chamber, and means for stretching the glass plate under the influence of its own weight.

10. In an apparatus for fire-polishing glass, the combination of a glass plate to be treated, a heating-chamber capable of accommodating the whole plate, means for supporting said plate along one edge in a vertical position, means for introducing said plate into and removing it from the heating-chamber, means for stretching the glass plate under the influence of its own weight, and means for heating said chamber to a temperature which increases upwardly.

11. In an apparatus for fire-polishing a glass plate, the combination of a heating-chamber capable of accommodating the whole plate, a support above said chamber, means for raising and lowering said support, means for forming a body of glass into a plate, means for conveying the edge of the glass plate over the chamber, a clamping device connected to the support, means for applying the clamping device to the edge of the plate while said edge is over the heating-chamber, and means for removing said conveying means when the glass plate is lifted.

12. In an apparatus for fire-polishing a glass plate, the combination of a heating-chamber capable of accommodating the whole plate, means for heating the chamber to a temperature which increases upwardly, a support above said chamber, means for raising and lowering said support, means for forming a body of glass into a plate, means for conveying the edge of the plate over the chamber, a clamping device connected with the support, means for applying the clamping device to the edge of the plate while said edge is over the chamber, means for removing said conveying means when the glass is lifted and means for conveying the glass plate from the cooler lower part through the upper hotter part of the chamber at a variable speed.

13. In an apparatus for fire-polishing glass, the combination of a glass plate to be treated, a fire-chamber capable of accommodating the whole plate, a vertical movable support above said chamber, a clamping device connected to the support and arranged to grip the glass plate along one edge, a motor operatively connected to said support to raise and lower it and to introduce said plate into and remove it from the fire-chamber.

14. In an apparatus for fire-polishing glass, the combination of a glass plate to be treated, a fire-chamber capable of accommodating the whole plate, a vertical movable support above said chamber, a clamping device connected to the support and arranged to grip the glass plate along one edge, a motor operatively connected to said support to raise and lower it and to introduce said plate into and remove it from the fire-chamber in a vertical position.

15. In an apparatus for fire-polishing glass, the combination of a glass plate to be treated, a fire-chamber capable of accommodating the whole plate, a vertical movable support above said chamber, a motor operatively connected to said support to raise and lower it, a plate-rolling table mounted laterally of said chamber and support and having a groove on the top near one edge, means for bringing said edge of the table over the chamber, a metal bar disposed in said groove with its upper face flush with the table-surface, a member connected with the support and arranged to register with said bar, means for pressing said bar and member together to clamp the glass plate along one edge, and means for removing the rolling-table when the glass plate is lifted.

16. In an apparatus for fire-polishing glass, the combination of a glass plate to be treated, a fire-chamber capable of accommodating the whole plate, flues in the walls of said chamber, means for heating said chamber to a temperature which increases upwardly, a vertical movable support above said chamber, a motor operatively connected to said support to raise and lower it, a plate-rolling table mounted laterally of said chamber and support, means for bringing the edge of said table over the chamber, a clamping device connected to the support and arranged to grip the glass plate along said edge, means for removing the rolling-table when the glass plate is lifted, and means for conveying the glass plate from the cooler lower part through the upper hotter part of the chamber at a variable speed.

17. In an apparatus for fire-polishing glass, the combination of a glass plate to be treated, a fire-chamber capable of accommodating the whole plate, a vertical movable support above said chamber, a motor operatively connected to said support to raise and lower it, a plate-rolling table mounted laterally of said chamber and support and having a groove on the top near one edge, means for bringing said edge of the table over the chamber, an iron bar disposed in said groove with its upper face flush with the table-surface, a series of electromagnets secured to the support having poles arranged to register with the iron bar, means for energizing said electromagnets to attract said iron bar and clamp the glass plate along one edge and means for removing the rolling-table when the glass plate is lifted.

18. In an apparatus for fire-polishing glass, the combination of a glass plate to be treated, a fire-chamber capable of accommodating the whole plate, a vertical movable support above said chamber, a motor operatively connected to said support to raise and lower it, a plate-rolling table mounted laterally of said chamber and support and having a groove on the top near one edge, means for bringing said edge of the table over the chamber, an iron bar disposed in said groove with its upper face flush with the table-surface, a fork fixed to the bottom of the support, a rotatable frame mounted in said fork, a series of electromagnets carried in said frame having poles arranged to register with the iron bar, weights on said frame to balance the electromagnets, means for energizing said electromagnets to attract said iron bar and clamp the glass plate along one edge, and means for removing the rolling-table when the glass plate is lifted.

19. In an apparatus for fire-polishing glass, the combination of a glass plate to be treated, a fire-chamber capable of accommodating the whole plate, a vertical movable support above said chamber, a motor operatively connected to said support to raise and lower it, a plate-rolling table mounted laterally of said chamber and support and having a groove on the top near one edge, means for bringing said edge of the table over the chamber, an iron bar disposed in said groove with its upper face flush with the table-surface, a series of electromagnets secured to the support having poles arranged to register with the iron bar, means for energizing said electromagnets to attract said iron bar and clamp the glass plate along one edge, means for removing the rolling-table when the glass plate is lifted, means for heating the fire-chamber to a temperature which increases upwardly and means for conveying the glass plate from the cooler lower part through the upper hotter part of the chamber at a variable speed.

20. The herein-described process for fire-polishing plate-glass, which consists in vertically suspending a plate-glass by one edge and introducing said plate into and removing it from a heating-chamber.

21. The herein-described process for fire-polishing plate-glass, which consists in vertically suspending a plate-glass by one edge and introducing said plate into and removing it from a heating-chamber capable of accommodating the whole plate.

In witness whereof I have hereunto signed my name, this 3d day of October, 1906, in the presence of two subscribing witnesses.

PAUL THEODOR SIEVERT.

Witnesses:
PAUL ARRAS,
EMIL WOED.